United States Patent [19]

Shepherd, Jr. et al.

[11] 3,962,399
[45] June 8, 1976

[54] METHOD OF FORMING A HANDLE CONNECTION FOR IMPACT TOOLS

[75] Inventors: Warren Arnold Shepherd, Jr., Shelbyville, Tenn.; Joseph James Guanaccia, Wethersfield, Conn.

[73] Assignee: The Stanley Works, New Britain, Conn.

[22] Filed: Jan. 30, 1975

[21] Appl. No.: 545,732

Related U.S. Application Data

[63] Continuation-in-part of Ser. No. 340,259, March 12, 1973, Pat. No. 3,877,826.

[52] U.S. Cl.............................. 264/261; 264/262; 264/266; 264/267; 264/271; 264/328
[51] Int. Cl.².......................................... B32B 31/00
[58] Field of Search ........... 264/263, 262, 274, 328, 264/35, 229, 261–263, 267, 266, 271; 145/61 R; 403/267

[56] References Cited
UNITED STATES PATENTS

| | | | |
|---|---|---|---|
| 1,172,396 | 2/1916 | Schlieder | 164/111 |
| 2,592,296 | 4/1952 | Kutik | 264/328 |
| 2,831,202 | 4/1958 | Lay | 145/61 R |
| 2,955,338 | 10/1960 | Gough | 29/460 |
| 3,287,485 | 11/1966 | McCord | 264/263 |
| 3,764,647 | 10/1973 | McDow | 264/262 |

*Primary Examiner*—Willard E. Hoag
*Attorney, Agent, or Firm*—Prutzman, Hayes, Kalb & Chilton

[57] ABSTRACT

A method of forming a handle connection for an impact tool such as a hammer is disclosed which includes the steps of forming the metallic tool head with a handle-receiving eye in which a portion of the eye spaced from the entrance end increases in cross-section toward the exit end, inserting a non-metalic handle having an end portion within the eye dimensioned to form a tight fit with the entrance end of the eye but having a clearance between it and the portion of the eye which increases in cross-section, said end portion in addition having a peripheral indentation or recess in its outer surface, injecting a tough, hard and rigid molding thermoplastic, preferably glass-filled, into the space between the end portion of the handle and the eye, the plastic being in a heated flowable state and being injected under sufficient pressure to compress the end portion of the handle, and permitting the plastic to solidify while maintaining said pressure whereby the plastic forms a tight mechanical interlock with the handle and has intimate wedging engagement with the portion of the eye of increasing cross-section thus effectively locking the parts against looseness and separation.

10 Claims, 7 Drawing Figures

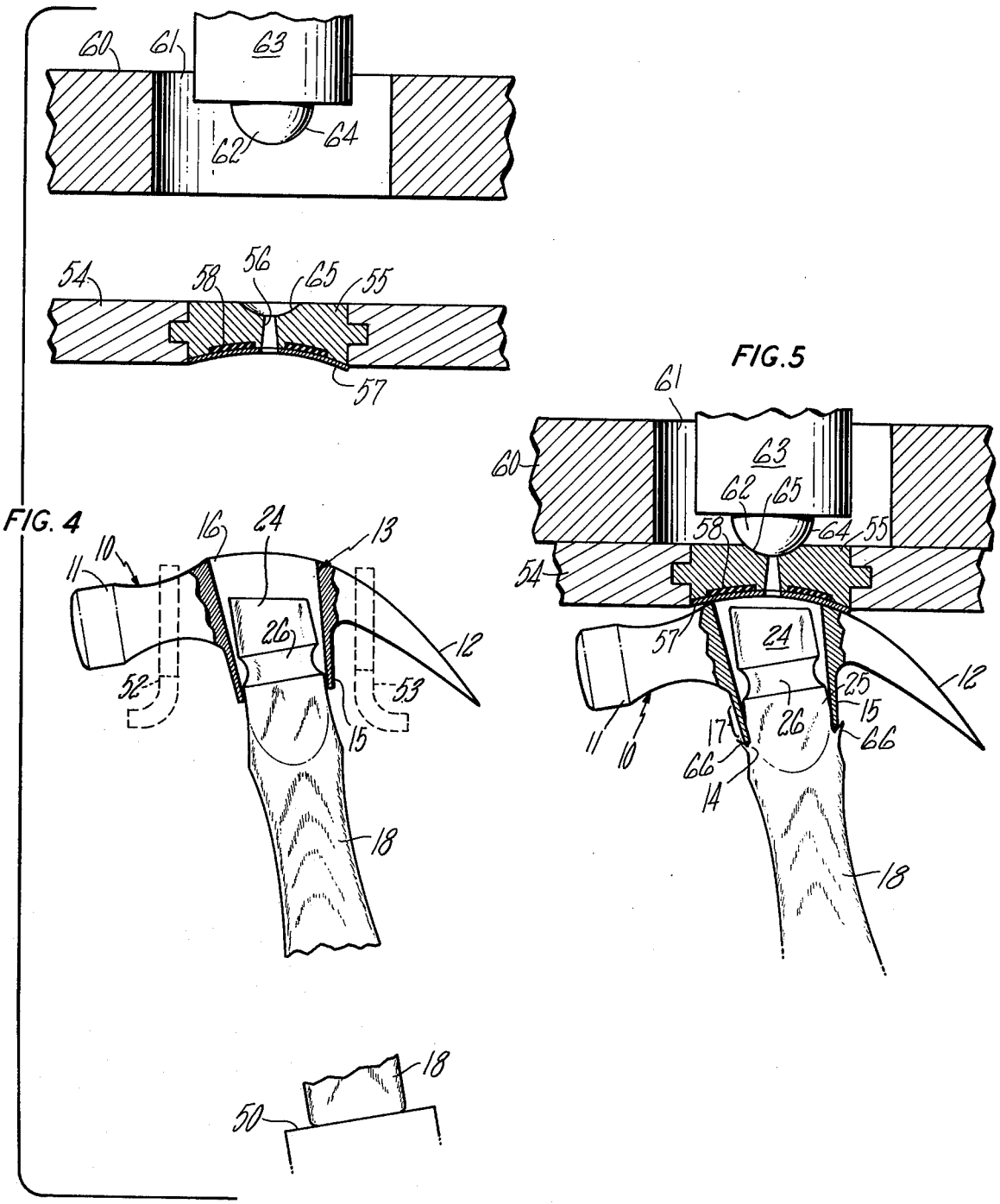

METHOD OF FORMING A HANDLE CONNECTION FOR IMPACT TOOLS

This application is a continuation-in-part of our prior application Serial No. 340,259, filed Mar. 12, 1973 now U.S. Pat. No. 3,877,826.

BACKGROUND AND SUMMARY OF THE INVENTION

The present invention relates in general to impact tools such as hammers, axes, hatchets and similar hand tools and is concerned more particularly with a method for forming an improved connection between the tool head and handle which reduces the tendency in such tools under normal conditions of usage to develop looseness between and separation of the head and handle. The invention is particularly advantageous for use in the manufacture of such tools where the handle is formed of non-metallic material such as wood or plastic.

Impact tools such as hammers have long been made with metallic heads and non-metallic handles, with the end of the handle inserted into and secured to a central opening or eye in the head. The principal and traditional way of forming the connection between the head and end of the handle has been to provide the eye of the head with an outward flare or enlarged cross-section toward its exit end and to expand the end of the handle which has been inserted through the smaller entrance end of the eye into tight contact throughout with the eye by wedging. This is accomplished by driving one or more wedges into the exposed end of the hammer forcing the end of the handle to expand or enlarge and bringing its periphery into compressive contact with the eye. While such connections are initially very tight, it is well known that they tend to deteriorate rapidly during normal usage of the tool. The exceedingly large and intermittent stresses that occur during usage of the tool together with such other factors as the presence of fissures in the end of the handle produced by the wedges, and the alternate swelling and contraction of the handle end as a result of changing ambient humidity conditions, all contribute to rapid deterioration of the tight fit resulting in looseness and eventual separation.

With the advent of improved adhesives and particularly the strong resin adhesives such as epoxy resins, such materials have been used to bond the handle to the eye of the tool head without or in combination with wedging. In the usual process employed, the adhesive is poured into the exit end of the eye after the handle is inserted and the tool is then permitted to stand until the adhesive sets which usually takes a substantial period of time and which is usually accompanied by shrinkage of the adhesive. Moreover, it has been found that in order to produce an effective connection including damping of the vibrations of the tool head, it is necessary when employing this technique to provide direct contact between the handle and metallic head throughout a substantial portion of the eye thus greatly reducing the available area for adhesive bonding. These limitations together with the inherent limitations of the bonding material frequently results in rapid fracture or release of the adhesive bond under stress, thus permitting the handle to loosen and be released without material increase in service life. Attempts to use rubber and rubber-like fillers or packings have met with similar difficulties.

Accordingly, it is an object of the present invention to provide a method for forming a handle connection for impact tools which avoids the above-mentioned disadvantages and which affords a tight effective connection between the head and handle having a long service life before repair or replacement is required.

Another object is to provide such a method which can be carried out without difficulty using readily available materials and with consistent high quality whereby the use of the invention is economically attractive as well as producing improved results.

An additional object is to provide a economical method of forming a handle connection requiring a minimum of manual operations and requiring a minimum of operating time.

A further object is to form a handle connection in a manner which will not adversely affect the desired qualities of the tool such as balance and absorption of vibrations and which will produce a connection that will not deteriorate due to external or ambient conditions.

Other objects will be in part obvious and in part pointed out in more detail hereinafter.

These and related objects are accomplished in accordance with the present invention by forming the eye of the tool head and the end of the handle with cooperating contours including spaced apart opposed surfaces in a direction axially of the handle and preferably at least one inclined camming or wedging surface on the interior of the eye and a peripheral recess in its handle, injecting a molding thermoplastic resin into the space between the surfaces under sufficient pressure to compress the end of the handle, the thermoplastic being heated to a flowable condition, and maintaining said pressure while permitting the thermoplastic to solidify, whereby the thermoplastic forms a tough, hard and rigid mechanical interlock compressibly engaging the handle and in intimate contact with the head thus forming a tight and durable connection effective over long periods of service.

A better understanding of the invention will be obtained from the following detailed description and accompanying drawing illustrating various preferred embodiments in which the principle of the invention is employed.

BRIEF DESCCRIPTION OF THE DRAWING

In the drawing:

FIG. 4 is a diagrammatic view showing the hammer in partially assembled condition mounted in an injection molding machine adapted for carrying out the method of the present invention, the parts of the machine being in the starting position;

FIG. 5 is a similar partial diagrammatic view showing the parts of the injection molding machine in position after being forced against the top of the hammer head;

DESCRIPTION OF THE PREFERRED EMBODIMENT

Figure 1:
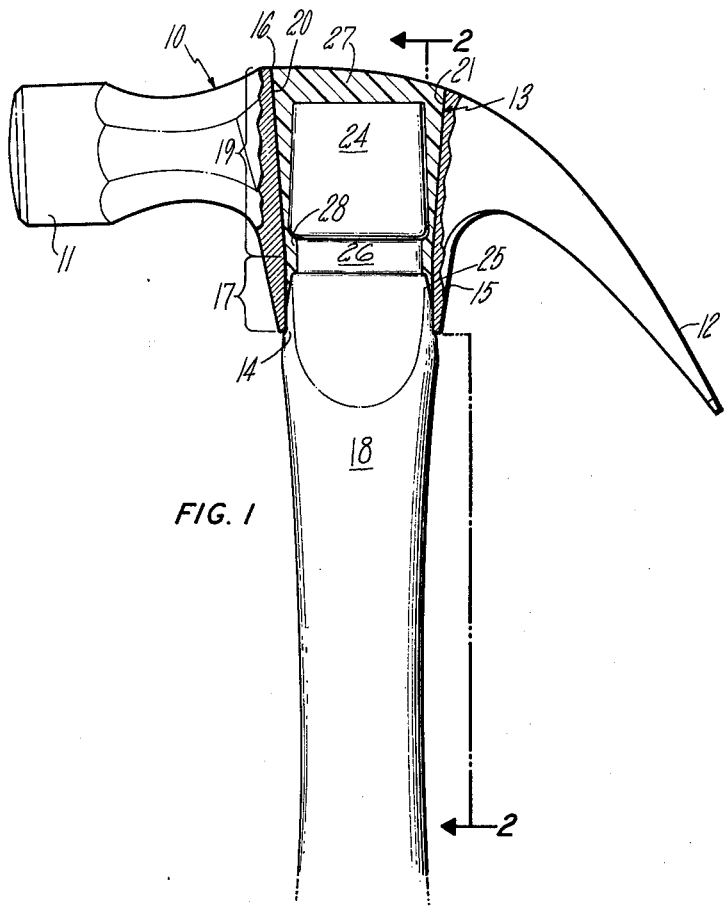
FIG. 1 is a fragmentary side view of a hammer, partially in cross-section, showing a preferred embodiment of a handle connection formed in accordance with the invention.
Figure 2:
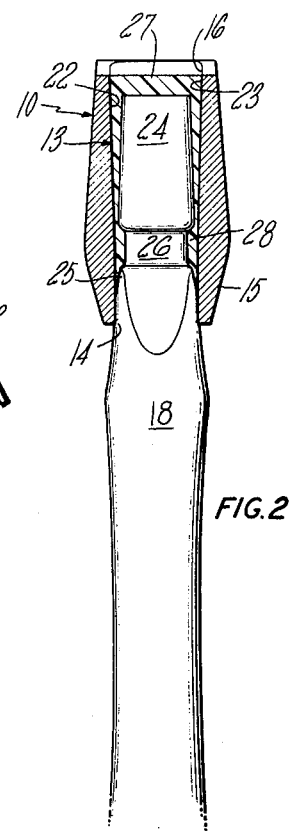
FIG. 2 is a fragmentary end view with a portion in section taken generally along the line 2—2 of FIG. 1.
Figure 3:
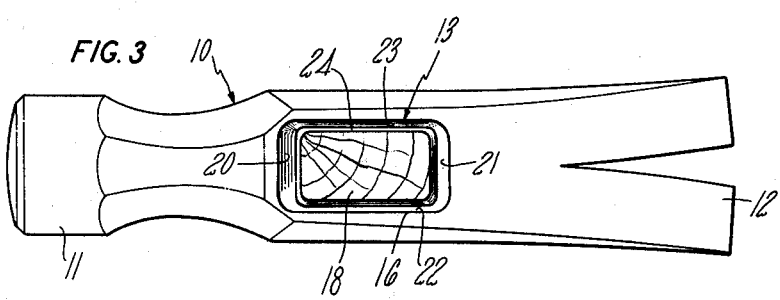
FIG. 3 is a top view thereof but with the plastic omitted.

Referring to the drawings, a handle connection made in accordance with the invention is shown embodied in a hammer having a forged steel hammer head 10 of the claw type provided with the usual poll 11 at one end and claws 12 at the other. Centrally of the head 10 is a handle receiving eye 13 which is a through opening having an entrance end 14 at the outer end of the shank or boss 15 and an exit end 16 at the upper face of the head 10. In the specific embodiment, the cross-section of the eye 13 is shown as generally rectangular although as will be apparent, the invention will apply equally to other cross-sectional configurations such as oval or round.

The entrance region 17 adjacent the entrance end 14, which in the specific embodiment extends slightly less than one-third of the length of the eye, is formed with a uniform cross-section throughout or with a very minor flare or divergence toward the entrance end 14. The function of the entrance region 17 is to form a tight frictional engagement with the end of the handle 18 when it is driven in from the entrance end 14, the handle end being dimensioned so that it will be slightly compressed at the entrance region and so that the entrance end 14 will dig slightly into the material of the handle when the handle end is fully inserted to form a tight seal.

The remaining region 19 of the eye 13 is formed with a gradually increasing cross-section toward the exit end 16. In the preferred embodiment, this is provided in part, by a slight forward inclination of the front end surface 20 and a slight rearward inclination of the rear end surface 21. When the amount of inclination may vary in the practice of the invention, it may be mentioned by way of example that in the specific embodiment shown in the drawings, the dimension of the eye 13 from front end surface to rear end surface at the exit end exceeds that at the entrance end by the order of approximately ¼ to 3/16 of an inch. In the specific embodiment, the transverse dimension of the eye 13 also is increased toward the exit end in that the side surfaces 22 and 23 are formed with a very minor outward flare toward the exit end 16.

As will be apparent to one skilled in the art, the hammer head 10 and its eye configuration as above described may be readily formed by conventional techniques such as forging, and the invention is not intended to be limited to the use of any specific equipment or forming method.

The end portion of the handle 18 which in the specific embodiment is a wooden handle, is inserted to the eye 13 through the entrance end of the eye. The end portion of the handle 18 is formed in accordance with the invention with a head portion 24 of smaller cross-section than the portion of the eye 13 adjacent the exit end 16 to provide a clearance between it and the eye 13 around its entire periphery and throughout its length. In the preferred embodiment, the sides of head portion 24 are tapered inwardly slightly toward the exit end for optimum clearance. The shoulder portion 25, of the handle is dimensioned to provide a friction fit and to form a tight connection with the entrance region 17 of the eye 13. Adjacent the shoulder portion 25 and between it and the head portion 24, there is formed a reduced section 26 which in its preferred embodiment is a circumferential groove which is relatively wide but shallow and formed with beveled edges. A typical groove would be one having a width of the order of ¼ inch and a depth of the order of ⅛ inch. When specific dimensions are given herein, they are intended as a specific example of a preferred embodiment but without limitation since the dimensions may be varied within reasonable limits and necessarily will vary with the type and size of tool. In the preferred embodiment, the head portion 24 is shown as terminating slightly short of the exit end 16 of the eye.

In accordance with the invention, a tough, hard and rigid thermoplastic 27 of the type having high impact resistance and dimensional stability is injection molded into the peripheral space around the end of the handle and between the handle and eye, and filling the exit end of the eye 13. Among the known commercially available plastics having the necessary physical characteristics for this purpose, for example, are polycarbonates such as sold under the trademark Merlon by Mobay Chemical Company and the trademark Lexan by General Electric Company, acetals such as the acetal homopolymers sold under the trademark Delrin by E. I. dePont deNemours & Company,, Inc. and the acetal copolymers sold under the trademark Celcon by Celanese Corporation, and ABS resins (acrylonitrile-butadiene-styrene) as sold under the trademarks Kralastic, Lustron, Cycolac and Abson by Uniroyal Chemical Company, Monsanto Chemical Company, Borg-Warner Corp., and B. F. Goodrich Chemical, Inc., respectively. Also, these resins may have fibrous glass incorporated in them, usually in the range of 10 to 20%, which enhances stiffness, creep resistance and dimensional stability, and the use of such glass-filled resins such as a 20% glass reinforced ABS plastic, for example, is preferred. These plastics are generally classified in the trade as rigid molding materials and may have characteristics which in some respects such as creep resistance approach that of some nonferrous metals such as zinc. While it is obvious that the physical characteristics will vary with composition and method of manufacture, it is preferred that a plastic be selected which has, for example a minimum tensile strength of the order of 9,000 psi, a minimum compressive strength of the order of 12,000 psi, and an impact strength in excess of 0.3 ft. lb. per inch. A Rockwell hardness of the order of M75–M85 is typical of these plastics. It is preferred also that such materials have low moisture absorption characteristics, a relatively high heat distortion temperature, and minimum mold shrinkage.

Figure 6:
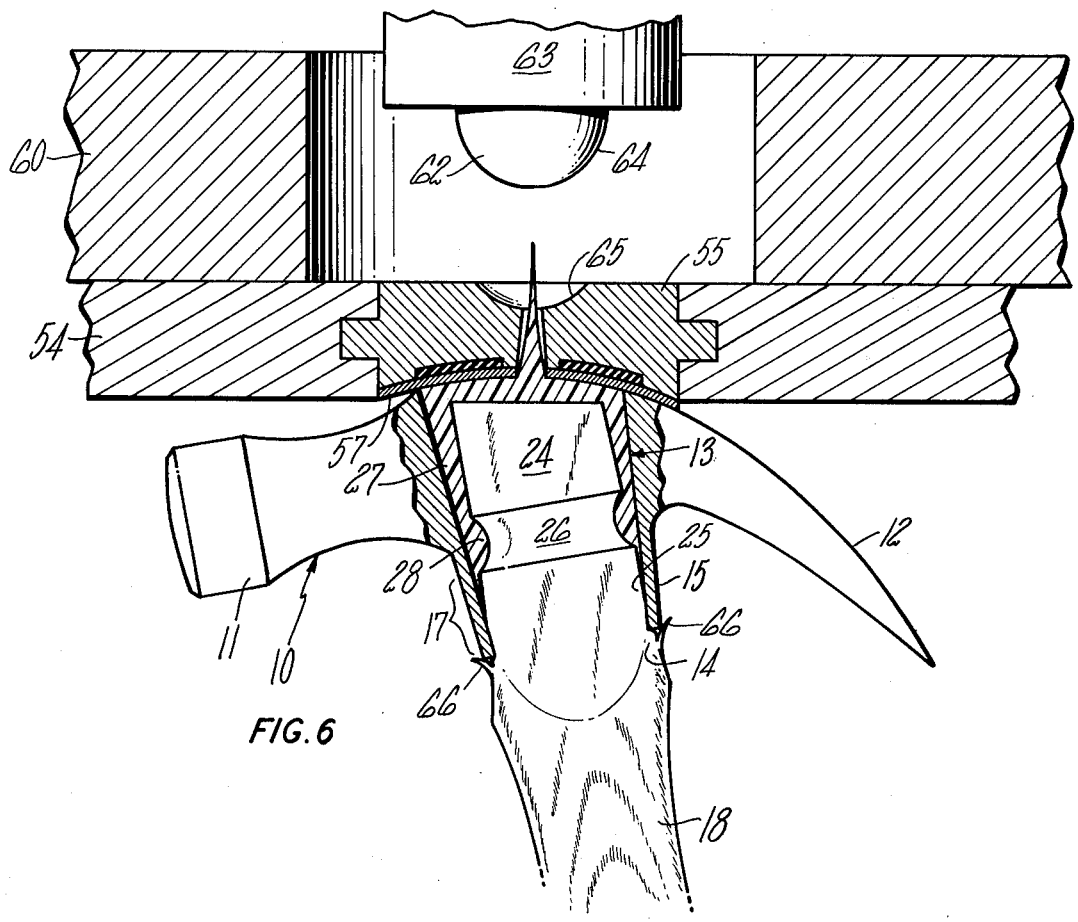
FIG. 6 is a similar view showing the parts of the machine in partially retracted position.

A preferred method of injecting the thermoplastic 27 into the exit end of the eye 13 is illustrated in FIGS. 4–6 of the drawings. As shown in FIG. 4, the handle 18 and head 10 are first partially assembled which is to say that the end portion 24 of the handle is inserted into the eye 13 but not forced to a fully seated or tight position. The bottom end of handle 18 is seated on a stationary platen 50 and held there in any convenient manner such as by means of a clamping device (not shown). The handle 18 in seated position is slightly inclined to the vertical so as to position the top of the head 10 in a generally horizontal position. The head 10 is preferably partially supported and guided by a jig consisting of two spaced apart stationary yoke-shaped supporting members 52 and 53 indicated in dotted lines which extend underneath and around the claws 12 and the bell and poll portion 11 adjacent the shank 15 of the head 10. Mounted immediately above the head of the hammer for vertical movement is a sealing plate 54 in which, centrally thereof, is mounted a sprue bushing 55. The sprue bushing 55 contains the sprue 56 and on its bottom is preferably constructed with a slightly yieldable surface provided by a shim 57 which may be formed of a sheet of spring steel material and which is backed by a resilient insert or spacer 58 made of rubber or the like. As a result of this construction when the sealing plate 54 is lowered sufficiently so that the bushing 55 engages and presses against the top of the head 10, the spring steel shim 57 and rubber backing 58 will yield as required to form a tight seal with the head 10 in the area surrounding the exit end 16 of the eye 13.

Mounted above the sealing plate 54 and also mounted for vertical movement is a movable top platen 60 having a central opening 61 accommodating a nozzle 62 of the injection unit 63 of a conventional injection molding machine. As indicated, the nozzle 62 has a rounded surface 64 adapted to engage the rounded recess 65 of the sprue bushing 55.

In the operation of the machine, the nozzle 62 is forced downwardly by means of a hydraulic ram or the like (not shown) and by virtue of a lost motion connection (not shown) moved downwardly relative to the movable platen 60 to a position such that the bottom surface of the nozzle extends slightly below the bottom surface of the platen 60. Thereafter, the movable platen 60 and nozzle 62 move in unison until the movable platen 60 engages the sealing plate 54 whereupon all three elements move downwardly together to cause the sprue bushing to engage the top of the head 10 and drive the head into fully seated position on the handle 18 as shown in FIG. 5 of the drawings. While various pressures may be used, it has been found that as a general rule that a ram pressure of about 800 psi is desirable to produce an adequate sealing pressure and also to drive the head 10 into fully seated position on the handle 18. In the preferred embodiment, the head 10 is driven downwardly approximately ½ inch relative to the handle which causes the lower edge of the shank 15 to dig into the wood portion 14 of the handle to form a tight seal. The jig yolk members 52 and 53 provide a limit for the downward movement of the head 10 and support the same during injection. In this position, the parts are in condition for injection of the heated thermoplastic which preferably takes place automatically at this stage. As will be appreciated, the thermoplastic is heated in the injection unit 63 of the injection molding machine and injected through the nozzle 62 and sprue 56 into the cavity or mold provided by the free space around the end portion 24 of the handle between the handle portion 24 and the interior surface of the eye 13. While the temperature required to render the thermoplastic molten or flowable for injection purposes can very materially depending upon the particular thermoplastic selected, as a general rule, an injection temperature of the order of 300°–600°F will suffice. The injection pressure utilized is preferably of the order of 6–10,000 psi and because of the shortness of the sprue 56, most of this pressure is transmitted to the mold cavity provided within the eye 13 and surrounding the handle portion 24 and groove 26. The substantial spacing between the head portion 24 of the handle and the eye facilitates the injection of the thermoplastic and insures that the thermoplastic will readily flow into this space and the groove 26 and will set up as a continuous and unitary mass completely filling all of the cavities. As the shoulder portion 25 of the handle forms a tight fit with the entrance region 17 of the eye, this provides a seal which readily withstands the high pressure of the injected thermoplastic during the injection cycle.

Because the compressive strength of a hickory wood handle, for example, is about 2,000 psi parallel to the grain and less than 500 psi perpendicular to the grain, the result of utilizing an injection molding pressure in excess of this compressive strength results in a compression and densifying of the end portion 24 of the handle. In accordance with the invention, this injection pressure is maintained on the thermoplastic until the thermoplastic sets or hardens which takes place relatively rapidly because of the chilling effect of the head 10. As the mass of a typical steel hammer head 10 weighs in the neighborhood of about 450 grams and the amount of thermoplastic injected into the eye 13 in forming the handle connection of a typical hammer made in accordance with the invention is only about 10 grams, it will be appreciated that the head 10 will act as an effective heat sink and the temperature of the thermoplastic will be rapidly reduced to the setting point without the need for external cooling. In actual practice, the solidification of the thermoplastic will occur in as little as 15 seconds.

Following the injection and solidifcation of the thermoplastic, the nozzle 62 is moved upwardly relative to the sealing plate 54 and movable platen 60 is shown in FIG. 6 causing the sprue portion of the injected thermoplastic to separate from the nozzle following which the sealing plate 54, movable platen 60 and nozzle 62 are returned to the original position shown in FIG. 4 of the drawings.

Figure 7:
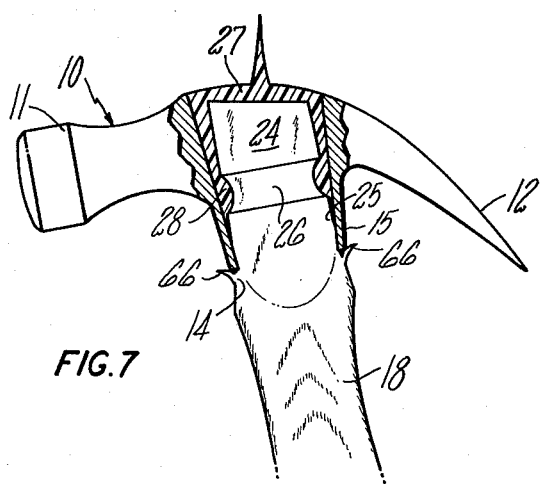
FIG. 7 is a fragmentary view partially in cross-section of the assembled hammer as removed from the injection molding machine but prior to final finishing.

As shown in FIG. 7 of the drawings, the assembled hammer as removed from the injection molding machine has the cavity of the eye 13 surrounding the end portion 24 of the handle completely filled with solid tough thermoplastic 27 which is in the nature of a cap encapsulating the end portion 24 of the handle and interlocking with the groove 26 while having wedging engagement with the interior of the eye 13. Because of the injection pressure used which, in accordance with the invention, is in excess of the compressive strength of the handle, there is provided an inherent compensation for the natural shrinkage of the thermoplastic which takes place during setting. As a result of the ability of the wood to expand becuse of its resiliency, it is assured that the end portion of the handle 24 will still be under tight compression and that the thermoplastic interlock will be in firm engagement with the eye 13 despite such shrinkage of the thermoplastic as may occur during setting. After the injection operation, substantially no finishing is required other than to clip off the thermoplastic sprue with a suitable clipping tool and to chip away the excess wood indicated at 66 which is struck out from the shoulder portion of the handle when the lower edge of the hammer head shank 15 digs into the shoulder portion of the handle under the compression of the injection molding machine.

As will be apparent, the plastic mass 27 when solidified provides a unitary tough, hard and rigid connecting element forming a mechanical lock between the handle and the eye of the head. The plastic mass in final molded form has an integral bead 28 which mechanically interlocks with the groove 26 and its upper portion increases in thickness and cross-section toward the exit end of the eye to form a wedge complementary to the wedging surfaces of the eye. The result is an interference fit engaging in shear with the reduced section 26 of the end of the handle 18 and a wedging fit with the outwardly tapering surfaces of the eye 13 which cannot support or loosen short of the destruction of the respective materials. Also, the tapered surfaces of the eye can be viewed as at least partially opposed to the upper edge of the groove 26 which are blocked apart by the hard plastic mass 27.

Although the thermoplastics specifically mentioned above as usable in the invention are primarily regarded as molding compositions which do not have adhesive characteristics, this lack of adhesive qualities is of no adverse consequence in the practice of the invention because the interconnection formed is mechanical in function and is not dependent upon any adhesive bond for its effectiveness. It will also be noted that in the preferred embodiment, the thermoplastic 27 is in contact with a large surface area of both the eye and handle end, and particularly the major portion located above the shoulder 25, it being an advantage of the present invention attributable in part to the physical characteristics of the thermoplastic used that it is unnecessary to have an extended surface-to-surface contact between the wood handle and metal eye as has usually been deemed necessary when forming the handle connections of the prior art.

Handle connections made in accordance with the method of the present invention have exhibited a marked improvement with respect to durability and particularly with respect to resisting the onset of looseness and eventual separation of the head and handle. For example, a standard test which is significant in measuring the durability of a handle connection is to apply a transverse force to the handle relative to the head to simulate a nail-pulling operation. In this test, with the head clamped in a stationary position and a force of 1,500 pound inches repeatedly applied to the end of the handle in a direction away from the claws, ordinary hammers in which the wooden handles were secured by conventional wedging techniques, develop a looseness of the order of 0.054 inches measured 3 inches from the eye after only 150 cycles. Samples of wooden-handled hammers made in accordance with the present invention on the other hand when tested in this manner remained intact and developed no appreciable looseness after 12,000 cycles at which point the tests were discontinued.

Another standard test which has been found to be significant in measuring the durability of a handle connection is to place the hammer in a testing machine which produces successive blows of the hammer against a steel anvil at a velocity of approximately 26 ft./sec. which is roughly equivalent to a normal full arm swing. Ordinary hammers in which the wooden handle is secured to the head by conventional wedging when tested on such a machine and subjected to 6,000 blows, develop a looseness of the order of 0.064 inches measured three inches from the eye. As compared therewith, representative samples of hammers fabricated and assembled in accordance with the present invention which have been subjected to this test and subjected to 6,000 blows on the machine, have remained tight without development of any appreciable looseness.

When subjected to humidity test cycles for 7 days at 100°F and 100% relative humidity, conventional wood handled hammers developed a looseness two to four times the magnitude of the preferred embodiment, representing a significant advantage.

It will be noted that in addition to forming a handle connection which maintains a tight connection between the handle and head under the high stresses to which the hammer is subjected during normal usage, and which is highly resistant to humidity, the use of a plastic which has a wide range of service temperatures and has good chemical resistance and weatherability which ensures that the connection will not deteriorate due to environmental or ambient conditions, particularly when the plastic also covers over the end of the handle at the exit end of the eye as shown in the preferred embodiment.

As will be apparent to persons skilled in the art, various modifications, adaptations and variations of the foregoing specific disclosure can be made without departing from the teachings of the present invention.

We claim:

1. A method of forming a handle connection for impact tools comprising the steps of providing a metallic tool head with a handle receiving eye which increases in cross-section toward an exit end and a nonmetallic handle having an end portion for insertion into the eye having a shoulder portion dimensioned for engagement with an entrance end of the eye while the remainder of the end portion is dimensioned to provide a clearance space between it and the eye and has a peripheral recessed portion therein adjacent the shoulder portion, inserting the end portion of the handle into the eye from the entrance end thereof and causing the shoulder to form a tight connection with the entrance end of the eye, injecting a heated thermoplastic through the exit end of the eye into the space between the end portion of the handle and the eye under a pressure in excess of the compressive strength of the material of the handle, compressing and densifying said material of the handle, and maintaining said pressure in excess of the compressive strength of the material of the handle while permitting the thermoplastic to solidify.

2. The method of claim 1 wherein the thermoplastic is heated to a temperature within the range of 300°–600°F prior to injection into the handle receiving eye.

3. The method of claim 1 wherein said clearance space is provided entirely around the periphery of the end portion of the handle, the peripheral recessed portion in the handle end portion is a circumferential groove, and the end portion of the handle is terminated short of the exit end of the eye.

4. The method of claim 3 wherein the handle is a wooden handle and the injection molding pressure is of the order of 6,000 to 10,000 psi.

5. The method of claim 1 wherein the handle is a wooden handle and the peripheral recessed portion in the end portion is a circumferential groove.

6. The method of claim 5 wherein the thermoplastic is a hard and rigid molding thermoplastic resin selected from the group consisting of polycarbonate, acetal and ABS resins, and glass fiber reinforced resins of said group.

7. The method of claim 5 wherein the end portion of the handle is terminated short of the exit end of the eye and sufficient thermoplastic is injected into the eye to cover the end of the eye and close the exit end of the eye.

8. The method of claim 7 wherein the thermoplastic is a hard and rigid molding thermoplastic resin selected from the group consisting of polycarbonate, acetal and ABS resins.

9. The method of claim 8 wherein said resin contains glass reinforcing fibers.

10. The method of claim 7 herein a sprue bushing is pressed against the exit end of the eye to drive the head tightly into engagement with the handle and to close the mold cavity provided by the space within the eye surrounding the end portion of the handle, and the thermoplastic is injected through the sprue.

* * * * *